United States Patent [19]

Johnson

[11] Patent Number: 4,771,886
[45] Date of Patent: Sep. 20, 1988

[54] APPARATUS AND METHOD FOR MANUFACTURING TWO-PLY CASSETTE ALBUMS

[75] Inventor: Breck J. Johnson, Plymouth, Minn.
[73] Assignee: Blackbourn, Inc., Eden Prairie, Minn.
[21] Appl. No.: 131,259
[22] Filed: Dec. 7, 1987

Related U.S. Application Data

[63] Continuation of Ser. No. 907,883, Sep. 16, 1986, abandoned, which is a continuation-in-part of Ser. No. 787,527, Oct. 15, 1985, Pat. No. 4,641,750.
[51] Int. Cl.$^4$ ............... B32B 31/18; B32B 31/20; B65D 85/672; B31B 1/64
[52] U.S. Cl. ................... 206/387; 156/245; 156/250; 156/251; 156/267; 156/268; 156/500; 156/510; 156/515; 156/498; 206/472
[58] Field of Search ............. 156/250, 251, 257, 267, 156/268, 510, 515, 245, 500, 498; 206/387, 472; 281/19 R, 29; 493/84, 133, 901

[56] References Cited

U.S. PATENT DOCUMENTS

| | | | |
|---|---|---|---|
| 2,767,756 | 10/1956 | Niles | 156/290 |
| 2,788,041 | 4/1957 | Carver . | |
| 3,215,450 | 11/1965 | Peterson . | |
| 3,315,718 | 4/1967 | Berman . | |
| 3,317,955 | 5/1967 | Schurman | 264/524 |
| 3,442,371 | 5/1969 | Deshong | 206/4523 |
| 3,640,379 | 2/1972 | Weingarden . | |
| 3,743,081 | 7/1973 | Roberg | 206/387 |
| 3,884,742 | 5/1975 | Roberts | 156/268 |
| 3,902,598 | 9/1975 | Koob . | |
| 4,341,307 | 7/1982 | Shyers | 206/387 |
| 4,377,430 | 3/1983 | Bexly et al. | 156/268 |
| 4,407,410 | 10/1983 | Graetz | 206/387 |
| 4,432,827 | 2/1984 | Graetz et al. | 156/285 |
| 4,496,048 | 1/1985 | Sykes . | |
| 4,501,361 | 2/1985 | Rose | 206/387 |
| 4,518,275 | 5/1985 | Rauch | 206/387 |
| 4,555,290 | 11/1985 | Graetz . | |
| 4,632,717 | 12/1986 | Graetz et al. | 156/245 |

FOREIGN PATENT DOCUMENTS

| | | | |
|---|---|---|---|
| 8402029 | 5/1984 | PCT Int'l Appl. | 493/901 |
| 593651 | 6/1975 | Switzerland | 220/337 |
| 2101970 | 1/1983 | United Kingdom | 206/387 |

OTHER PUBLICATIONS

Brochure, Josef Uhlmann, Maschinenfabrik, GmbH & Co., Pharmaceutical Safety with Packaging Machines from the Specialist, Undated.
Brochure, Mahaffey & Harder Engineering Co., Sureflow 9000E Series Thermoform, Fill and Seal Packaging Machine Systems, Undated.
Brochure, Hassia Verpackung GmbH, Thermoform Packager Thm 17/48, Undated.
Brochure, Paul Kiefel Hochfrequenz-Anlagen GmbH, Machines for the Stationary Industry, Undated.
Brochure, Paul Kiefel Hochfrequenz-Anlangen GmbH, HF-Generators Manufacturing Programme, Undated.
Brochure, Thermoforming S.p.A., Thermoforming Packform ECO Packaging Machines, Undated.
Brochure, Paul Kiefel GmbH, Packaging Plants, Undated.
Brochure, Paul Kiefel GmbH-Thermoformmaschinen, Rational Packaging with Kiefel Thermoforming Machines, Undated.
Brochure, Paul Kiefel GmbH Thermoform-Maschinen, A Review of Standard Machines in our Manufacturing Programme, Undated.
Brochure, Paul Kiefel GmbH-Thermoformmaschinen, Packagings Economical Safe and Attractive with Kiefel Thermoforming Machines, Undated.
Brochure, FIAB System AB, FIAB Bandomatic, Undated.
Brochure, GEAF Generator Elettronici Alta Frequenz, GEAF, Undated.

*Primary Examiner*—Caleb Weston
*Attorney, Agent, or Firm*—Merchant, Gould, Smith, Edell, Welter & Schmidt

[57] ABSTRACT

A two-ply, book-style album comprises an inside tray sheet (12) and an outside cover sheet (14). The sheets (12, 14) are preferably formed from high-density polyethylene, and are thermally heat sealed together via a peripheral seal (34) and spine rules (36). The spine rules are formed into the front or obverse surface of the inside tray sheet (12) to define living hinges. An apparatus (70) and method for automatically manufacturing the albums (10) is also disclosed.

17 Claims, 8 Drawing Sheets

APPARATUS AND METHOD FOR MANUFACTURING TWO-PLY CASSETTE ALBUMS

CROSS REFERENCE TO RELATED APPLICATION

This is a continuation of application Ser. No. 907,883, filed Sept. 16, 1986, abandoned, which in turn is a continuation-in-part of copending application Ser. No. 787,527 filed Oct. 15, 1985 now U.S. Pat. No. 4,641,750.

TECHNICAL FIELD

The present invention relates generally to a vacuum-formed, thermally, heat-sealed container for video cassettes and the like. More particularly, this invention concerns a unique two-ply album of improved construction utilizing fewer pieces formed from continuous sheets, on an in-line basis, to achieve greater production economies.

BACKGROUND ART

Book-like containers or albums have been widely utilized for packaging cassettes and other types of media materials. Such albums are basically of three-ply construction consisting of a stiff inside pair of trays of polyvinyl chloride (PVC), a flexible vinyl hinge strip interconnecting the trays, an outer cover of flexible vinyl, and rigid inserts of cardboard or chipboard between the cover and trays for rigidity.

It has been common practice to manufacture such vinyl albums by first laying the separate trays upside down in a nesting fixture, followed by positioning the hinge strips over the adjacent edges of the trays. Rigid inserts of cardboard or the like are then positioned over the trays and hinge strips, followed by a cover sheet. Any "trap-in" or clear vinyl overlay defining a pocket for a book jacket or the like, is then laid over the cover, after which the sealing die is actuated to seal the edges of the trays, hinge strips, cover, and any trap-in sheet by radio frequency (RF) radiation to secure the album. The completed albums are then removed from the fixture and inspected, and any excess material is stripped from the periphery of the albums before shipment to the customer for packing and resale as a packaged video product. Such albums have been available from Blackbourn, Inc., the assignee of the present invention, and others for years.

This construction technique results in albums of high quality but somewhat high unit cost. The relatively high unit cost has been due primarily to the extra time and labor involved in properly positioning and laying up the various pieces by hand in the nesting fixture. In addition, since overlying edge portions of the trays, hinge strip, and cover are sealed together to form spine rules, it has been necessary to slip an extra piece of insulating material between any trap-in and the hinge area of the cover to avoid sealing of the trap-in to the cover on the spine in order to provide a "full open" trap-in extending between the covers across the back of the album. This of course requires further time and labor, which can be significant factors in the manufacture of relatively low cost, high volume products of this type.

In 1980, Blackbourn produced and offered the "EconoPak" album in response to the need for a lower cost RF heat-sealed album of the same or similar quality. Instead of separate trays and a separate vinyl hinge strip between the trays, the Econo-Pak album incorporated a one-piece stiff molded sheet defining the trays and an integral spine liner portion therebetween, together with cardboard inserts between the trays and cover but not between the spine liner portion of the inner tray sheet and the spine portion of the outer cover sheet, and was otherwise constructed as before.

More recently, U.S. Pat. Nos. 4,407,410 and 4,432,827 have issued for a book-type cassette holder and method of making same. These patents show an RF heat-sealed album which is identical to the prior Blackbourn EconoPak, except for omission of the seals on the spine so that the integral spine liner portion between the trays and the spine portion on the cover can flex outwardly across their entire widths. Since this construction does not incorporate any seals or spine rules on the spine, it facilitates provision of a full open trap-in because there is no need to insulate the trap-in from any sealing along the spine. This construction has certain efficiencies over the albums with separate trays and vinyl hinging strips of the prior art. However, proper positioning and lay-up of the various components, which are done primarily manually, are still required and thus limit the efficiencies obtainable by this technique.

Even more recently, U.S. Pat. No. 4,555,290 has issued for a method of making such cassette holders on a mass production basis from stiff and flexible sheets of thermoplastics material unwound from reels. While this technique offers some advantages, there are still some disadvantages associated therewith. One significant disadvantage is that rigid inserts are still required for reinforcement, which of course increases material costs and can affect overall production speed even when the inserts are handled automatically. Since the albums are not sealed on the spine, they tend to require the additional rigidity provided by the inserts. This also means that proper tensioning of the flexible cover sheet is more critical, which can also affect overall speed of the system.

It will be appreciated that there is an increasing demand for prerecorded video cassettes and other products. There is thus a need for an improved video cassette album whose construction offers substantial manufacturing efficiencies over the prior art.

SUMMARY OF INVENTION

The present invention comprises an improved video cassette album and method of manufacture thereof which overcomes the foregoing and other difficulties associated with the prior art. In accordance with the invention, there is provided a two-ply video cassette album comprising a cover sheet of semi-rigid thermoplastic sheet material, and a tray sheet of molded semi-rigid thermoplastic sheet material defining a pair of interfitting complementary trays interconnected by an integral spine liner portion. The outer cover sheet and inner tray sheet are each of one-piece construction, and are preferably formed of high-density polyethylene to eliminate the need for intermediate cardboard inserts for rigidity. After the inside and outside sheets are laid up in a nesting fixture, the sealing die is actuated to thermally heat-seal the outside peripheries of the sheets as well as opposite sides of the spine extending between the top and bottom edges of the sheets. The album is sealed on the spine from the inside by means of heated spine rules, while the outside or back surface of the cover sheet is cooled, so as to form grooves or areas of reduced thickness in the inside sheet which function as "living hinges" without disfiguring the outer sheet so that the album can flex across substantially the entire width of its spine without the stress concentrations associated with conventional spine rules. If desired, a cover sheet of thermoplastic material, preferably low-density polyethylene, can be provided over the cover sheet for sealing about three sides thereof to form a "trap-in" pocket. Manufacture is preferably carried out automatically on an in-line basis from rolls of thermoplastic sheet material for maximum production speed and economy.

BRIEF DESCRIPTION OF THE DRAWINGS

A better understanding of the invention can be had by reference to the following Detailed Description in conjunction with the accompanying Drawings, wherein.

DETAILED DESCRIPTION

Referring now to the Drawings, wherein like reference numerals designate like or corresponding elements throughout the views, and particularly referring to FIGS. 1–5, there is shown the two-ply video cassette album 10 of the invention. As will be explained more fully hereinafter, the album 10 is of improved, simplified two-ply construction in order to achieve better manufacturing economies over the prior art in an industry where the products are characterized by high production volume and low unit cost.

Figure 1:
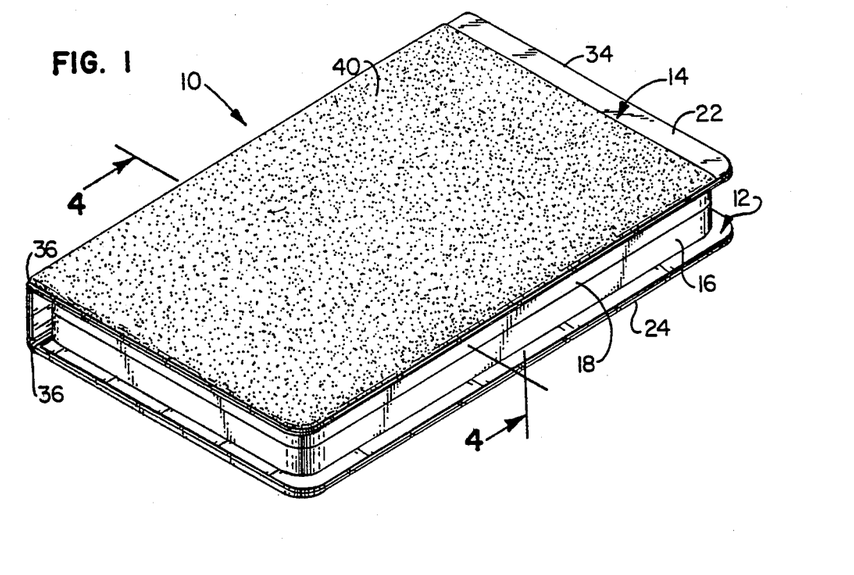
FIG. 1 is a perspective view of the video cassette album of the invention, in closed position.
Figure 2:
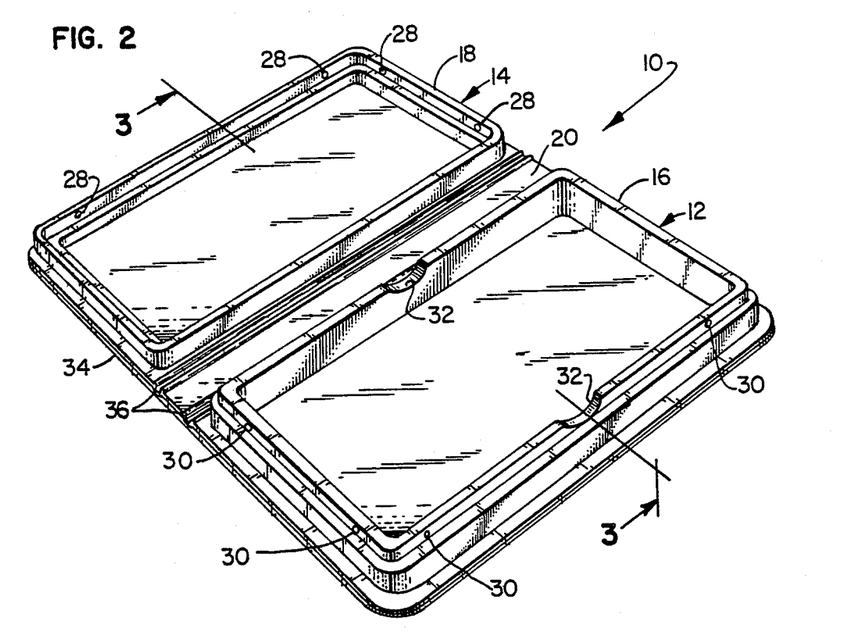
FIG. 2 is a perspective view of the video cassette album in open position and without a cassette therein.
Figures 3, 4, 5, 5A, 5B:
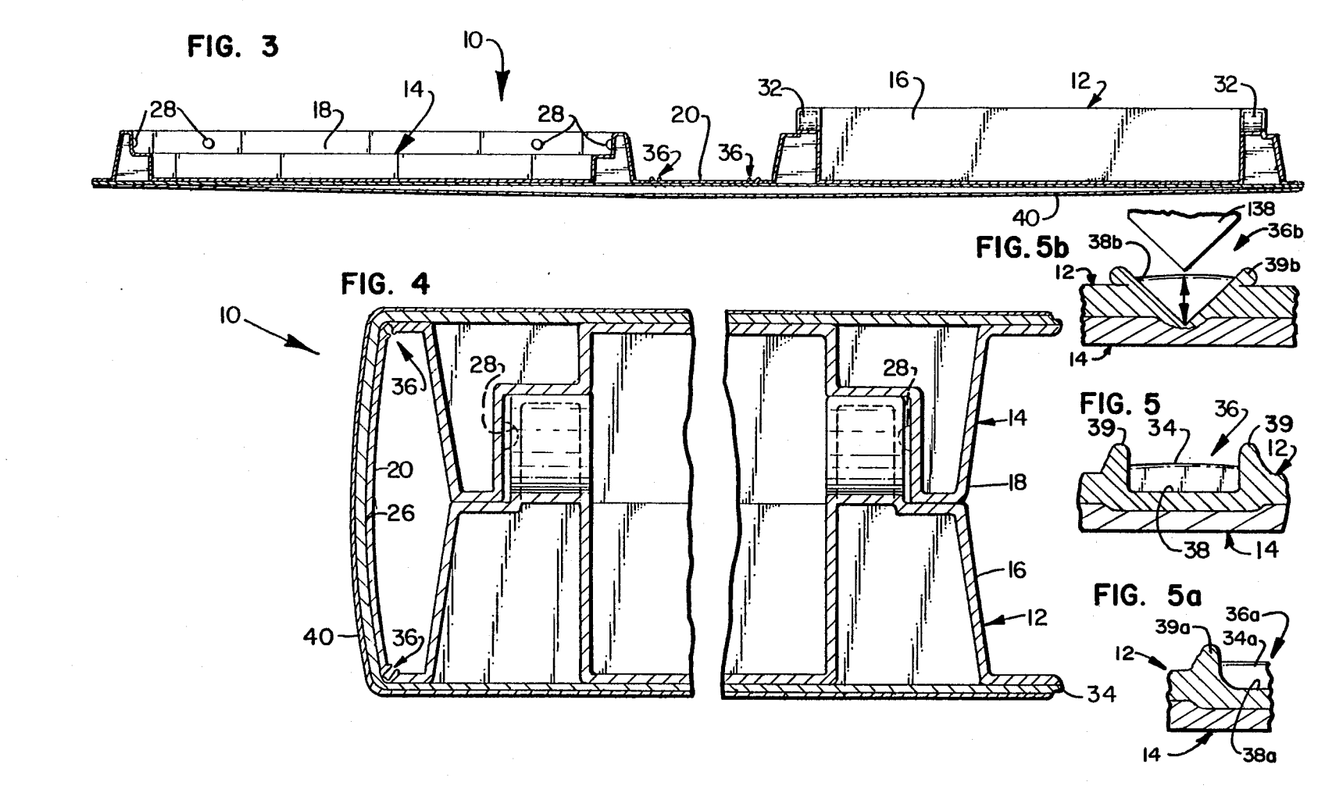
FIG. 3 is a cross-sectional view taken along lines 3—3 of FIG. 2 in the direction of the arrows.
FIG. 4 is an enlarged cross-sectional view taken along lines 4—4 of FIG. 1 in the direction of the arrows.
FIG. 5 is an enlarged cross-sectional illustration of an inside spine rule of the album.
FIG. 5a is a view similar to FIG. 5, but showing a modified spine rule.
FIG. 5b is another view similar to FIG. 5, but showing another modified spine rule.

The album 10 comprises two sheets 12 and 14 of suitable thermoplastic material secured about their peripheries. The inner sheet 12 defines a pair of interfitting trays 16 and 18 and connecting spine portion 20. Trays 16 and 18 can be formed in the inner sheet 12 by means of a conventional vacuum-forming technique. The trays 16 and 18 form a cavity for a video cassette (not shown) when closed in stacked relationship as illustrated in FIG. 4. Trays 16 and 18 include inner and outer peripheral walls joined by a top wall defining complementary male/female portions that form a dust seal when closed.

The outer sheet 14 defines a pair of covers 22 and 24 and connecting spine portion 26. Each sheet 12 and 14 is of one-piece, integral construction.

In accordance with the preferred embodiment, the sheets 12 and 14 are each formed of semi-rigid thermoplastic material, such as twenty to forty gauge high-density polyethylene. The use of semi-rigid thermoplastic material in both sheets 12 and 14 is preferable because it provides sufficient rigidity without cardboard inserts between the sheets. Album 10 utilizes no rigid cardboard inserts between sheets 12 and 14 and was specifically designed to have the necessary rigidity and structural integrity without such inserts, while also being easy to open and close.

Raised bumps 28 are provided about the inside upper edge of tray 18, and complementary corresponding recesses 30 are provided about the outside upper edge of tray 16 to form a releasable detent-type locking means for securing the album 10 in closed position. As illustrated, two raised bumps 28 and complementary recesses 30 are provided on each side of the trays 16 and 18. In addition, a pair of finger recesses 32 are provided in opposite lateral sides of the upper edge of tray 16 to facilitate gripping and removal of a video cassette therefrom.

If desired the interfitting portions of trays 16 and 18 can be slightly tapered, at 2°–3° for example as shown in FIG. 5b, to avoid the need for locking dimples 28 and recesses 30 altogether or to augment them and thus provide better retention when album 10 is closed.

Sheets 12 and 14 are secured together by means of a peripheral seal 34 extending completely around the peripheries of the sheets, and by a pair of spine rules 36 extending between the upper and lower edges of the sheets. The peripheral seal 34 is preferably formed by means of a thermally-heated sealing die which simultaneously cuts and seals the edges of the sheets by direct thermal contact at about 385–405 degrees F. The spine rules 36 are also formed by means of a thermally-heated sealing die, of somewhat lesser temperature, in the form of two laterally spaced-apart thermally-heated rules or bars, at about 370–380 degrees F., which form narrow depressions or longitudinal notches into sheet 12 from the inside. As is best seen in FIG. 5, each spine ruling 36 comprises a narrow groove or recess 38 and raised borders 40 extending between the peripheral seal 34 on opposite top and bottom sides of album 10.

The particular configuration of the spine ruling 36 comprises a significant feature of the present invention. In contrast to the prior art, which utilized spine ruling that formed relatively wider areas of reduced thickness in both sheets, the spine rules 36 of album 10 are relatively narrow and extend into the front surface of the inside tray sheet 12 to a depth of at least half the thickness of the inside sheet. As used herein, the terms "front" or "inside" surface of sheet 12 means that surface or side facing up in FIG. 2. The recess can be about 0.125 inch wide and about 0.010 inch deep in the case of twenty gauge material for sheet 12, as shown, and some slight compression of sheet 14 can result. However, it will be understood that the recess 38 could be extended completely through the inner tray sheet 12 and possibly partially into the adjacent cover sheet 14, if desired. This results in "living hinges" which facilitate opening and closing of album 10 in book-like fashion, without marking of the outside cover 14 in order to provide a less square spine (when album 10 is closed) of smooth, pleasing appearance. In the prior art, the spine ruling forms relatively wider areas of reduced thickness in the inside and outside sheets, as well as in any intermediate hinge strip, to form living hinges which are apparent from either side and which are also points of stress concentration that can lead to cracking. The present invention overcomes those problems by forming narrow spine rules 36 primarily into the inside sheet 12 so that the sheets 12 and 14 are sealed together over two narrow areas, not evident from the outside, which serve as living hinges and enable the two spine portions 20 and 26 to flex over a wider area for better stress distribution, less susceptibility to cracking, as well as a more pleasing appearance of less squarish shape.

If desired, an overlay sheet 40 can be provided about the outside sheet 14 for purposes of defining a "trap-in" pocket to receive a jacket, label or the like for purposes of identification. The overlay sheet 40, which is preferably formed of suitable thermoplastic material such as six-gauge low or medium density polyethylene, is usually sealed about only three edges so that the top edge is free to receive a label therein, although it can be sealed about all four edges to seal a label or jacket therein.

FIGS. 6–9 illustrate the method by which album 10 is manufactured. The album 10 can be manufactured four-up or eight-up, which is to say four or eight albums at a time, depending upon the particular nesting fixture and die equipment utilized. However, for purposes of illustration, we have shown the manufacture of a single album 10. The inner sheet 12 defining trays 16 and 18 and spine portion 20 is pre-formed by vacuum molding in conventional fashion. The uncut, pre-formed inner tray sheet 12 is then placed upside down into a nesting fixture 42 having appropriate recesses therein for receiving the trays 16 and 18 so that the reverse or back side of sheet 12 is facing upward. The raised wall portions of trays 16 and 18 extend into recessed position in the die 42, while the other portions of the tray sheet 12 are supported horizontally in fixture 42.

Figure 6:
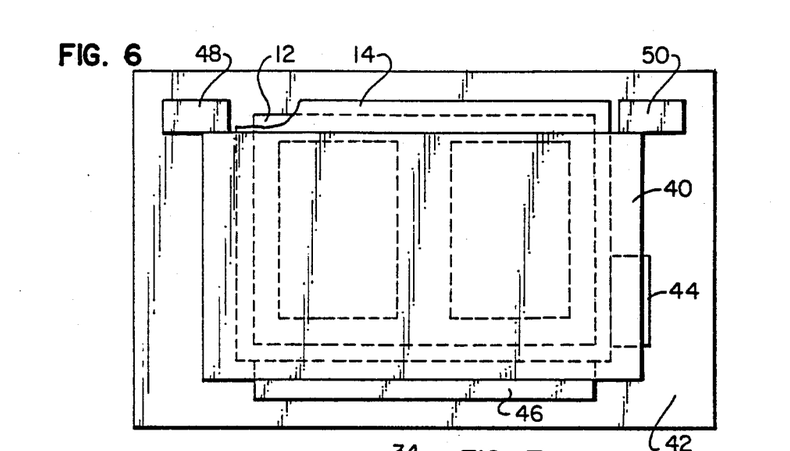
FIGS. 6–9 illustrate the method of manufacturing the video cassette album of the invention.

Following placement of the tray sheet 12 in upside down position in the nesting fixture 42, the outer cover sheet 14 is then laid over the back side of the tray sheet. Locating pins or blocks 44 and 46 are provided on the fixture 42 for positioning the cover sheet 14 in proper overlying relationship with the tray sheet 12.

Following placement of the cover sheet 14 over the back side of the tray sheet 12, the optional overlay sheet 40 can then be placed over the cover sheet, if desired. Locating pins or blocks 48 and 50 are also provided for locating the overlay sheet 40, and particularly the upper edge thereof, in proper position relative to the underlying cover sheet 14 and tray sheet 12.

Figure 7:
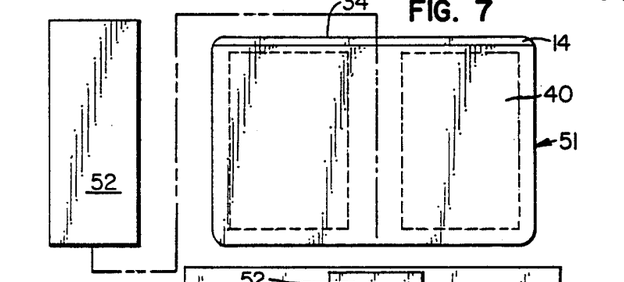

After the sheets 12, 14 and 40 have been laid up in this fashion, the overlying die (not shown) is actuated to bring it down into engagement with the fixture 42 in order to simultaneously cut the sheets and provide a peripheral seal 34, by thermal heating, resulting in a semi-complete album 51. FIG. 7 illustrates the back of the semi-complete album 51 after the first die hit when the peripheral seal 34 is formed, but before the second die hit when the spine rules 36 are formed. If the album 51 includes an overlay sheet 40, an insulating sheet 52 must be placed between sheets 40 and 14 before the second die hit.

Figure 8:
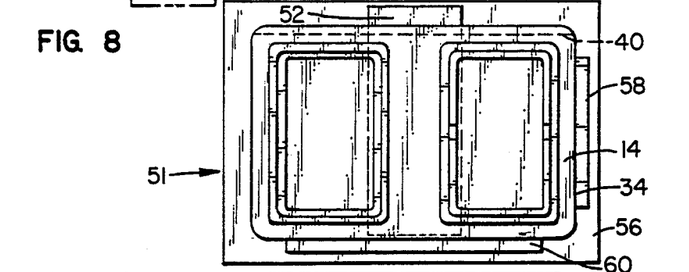

FIG. 8 shows the album 51, right side up, in position on another die 54 for the second die hit. Again, locating pins or blocks 56 and 58 are provided on the die 54 for properly locating the semi-finished album 51 relative to the top die portion (not shown).

Figure 9:
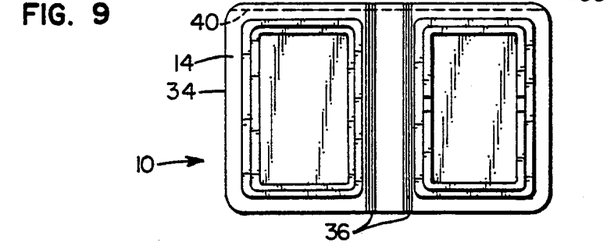

FIG. 9 shows the finished album 10 with spine rules 36 after the second die hit and removal of the insulating sheet 52.

If desired, sheet 52 can be eliminated and a cooled back-up plate can be used to control heat transfer from the heated die through sheets 14 and 40, to avoid the need for a second die-hit.

As explained above, FIGS. 1–5 illustrate the constructional details of the two-ply album 10 herein, while FIGS. 6–9 illustrate a method of manufacturing the album by means of a two die-hit technique. This technique, which is somewhat manually intensive, is suitable for manufacturing albums 10 on a limited basis, but is not adapted for production on a large scale basis. It will be appreciated that products of this type are characterized by relatively low unit cost and high production volume, which in turn means that small cost savings in time and/or labor can be significant. Instead of utilizing a two die-hit technique requiring use of an extra peice of insulating material to prevent sealing of the trap-in or overlay sheet to the cover on the spine, when such a trap-in is called for, it is preferable to utilize a technique which requires only one die-hit without any such insulating material or changeover in equipment regardless of whether a trap-in sheet is required. FIGS. 10–16 illustrate an apparatus and method for manufacturing two-ply cassette albums 10 on an automatic basis which overcomes these difficulties.

Figures 4A, 11:
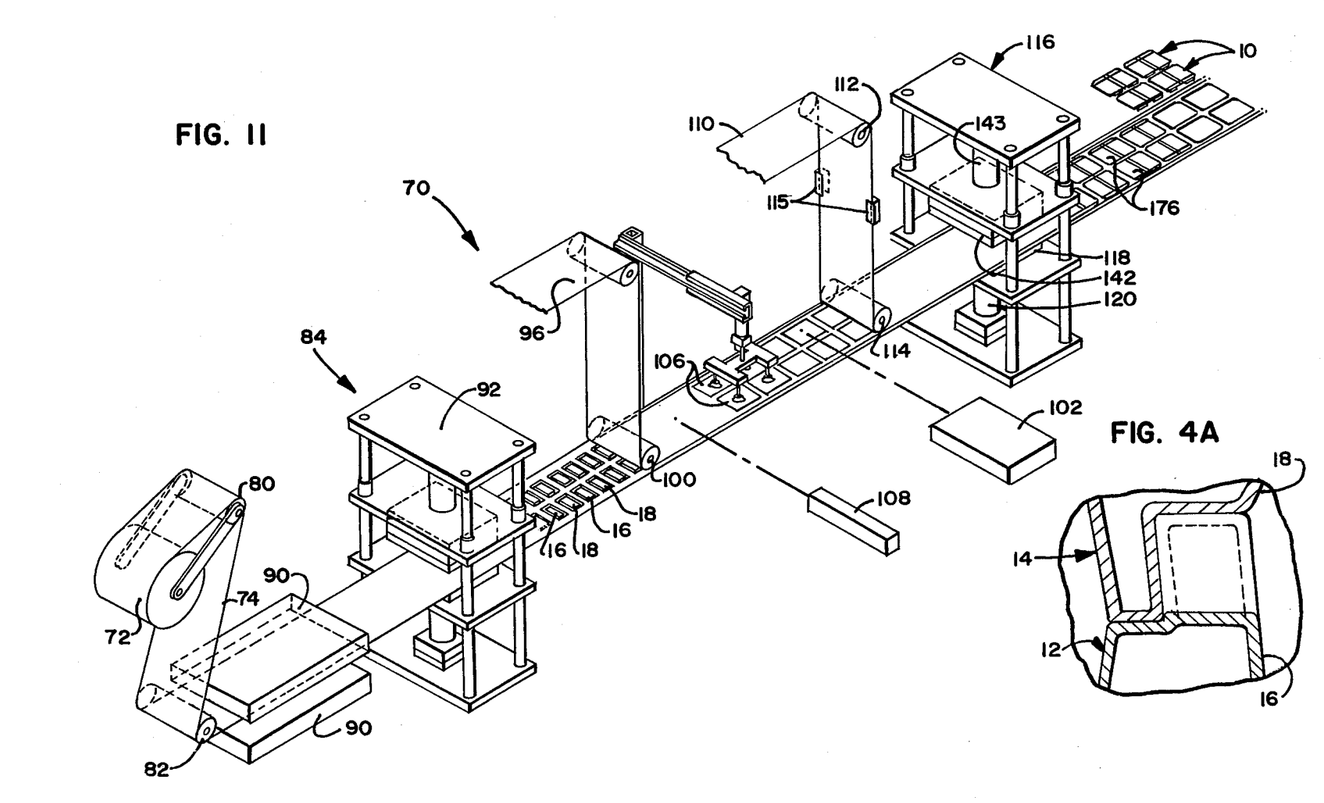
FIG. 4a is a view similar to FIG. 4, but showing a modified closure.
FIG. 11 is a somewhat schematic, perspective view of the apparatus.
Figure 10:
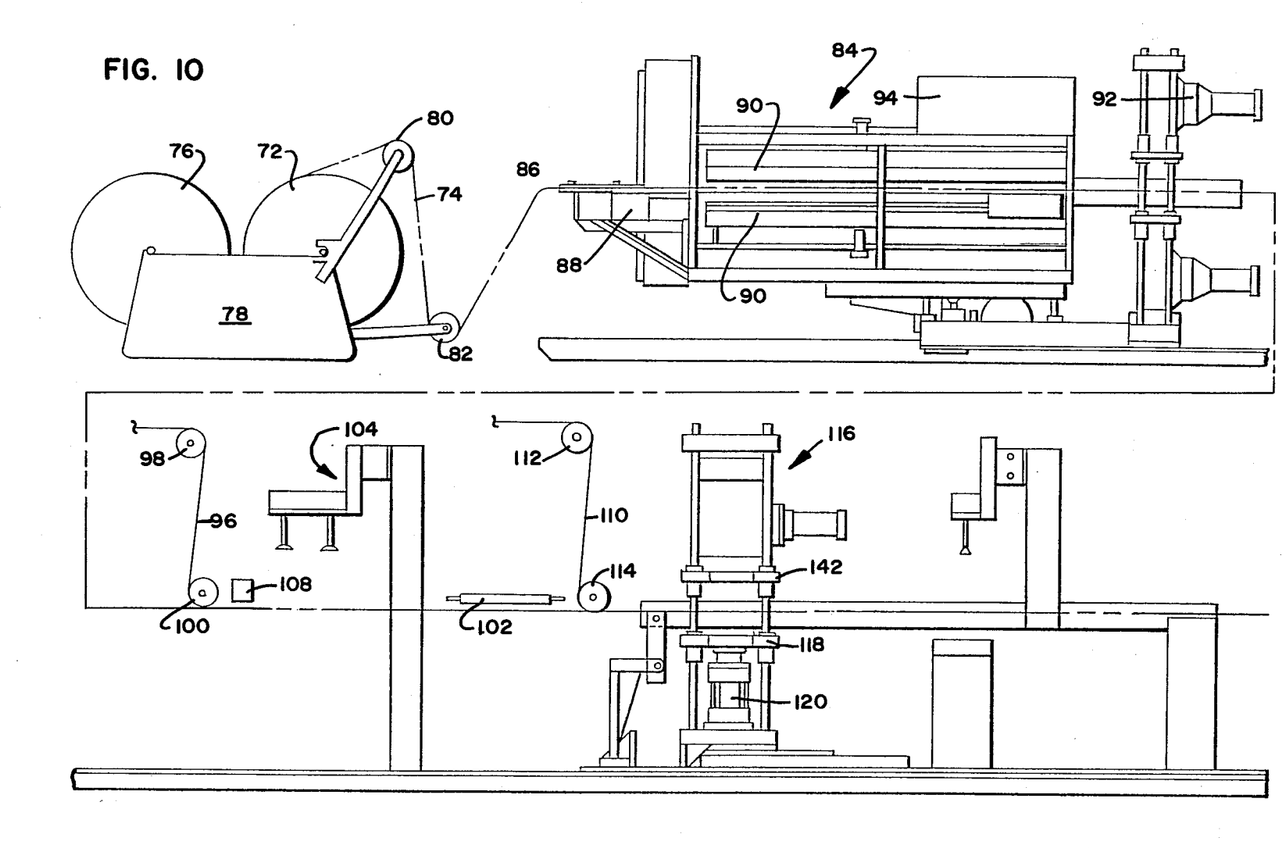
FIG. 10 is a side elevational view of an apparatus for manufacturing two video casette albums on an automatic basis in accordance with the invention.

Referring now to FIGS. 10 and 11, there is shown the system for automatically manufacturing two-ply albums 70 in accordance with the invention. The system 70 is particularly adapted for manufacturing two-ply cassette albums having thermally scored living hinges formed from the tray side, like album 10, continuously on an in-line basis at production rates of between about 1600 and 3600 albums per hour. The system 70 includes a roll 72 of sheet material 74 from which the inner tray sheets 12 are to be formed. The sheet material 74 preferably comprises semi-rigid thermoplastic material, such as 20 gauge high-density polyethylene. A reserve supply roll 76 of similar material is mounted in tandem with roll 72 on a mule 78 so that the supply roll can be replaced without interrupting operation of the overall system 70.

The sheet material 74 is fed from roll 72 and around guide rollers 80 and 82 along an input path into a thermoformer 84, which is of substantially conventional construction, and which includes a guide assembly 86 and an adjustable pin chain conveyor crank 88 for feeding the sheet material 74 along the predetermined input path between a pair of retractable heaters 90 and on through a forming press 92. Drive speed and dwell time are controlled via a programmer 94. Any suitable thermoformer can be utilized. For example, the thermoformer 84 can comprise a Sentinel Model 2500 electropneumatic thermoformer available from Packaging Industries Group, Inc. of Hyannis, Mass.

As the sheet material 74 is fed through the thermoformer 84, it is first heated from both sides by sandwich heaters 90, after which pairs of spaced-apart trays 16 and 18 are formed by press 92 into the heated sheet material. In the preferred embodiment, the sheet material 74 is fed through thermoformer 84 with its front or obverse side down and its back or reverse side up, with the trays 16 and 18 being formed into the front side of the sheet material. A plurality of pairs of trays 16 and 18, each of which is connected by an integral spine portion 20, can be formed simultaneously into the preheated sheet material 74. For example, it is comtemplated that four such pairs would be formed with each cycle of the thermoformer 84, between advancements of the sheet material 74, although more pairs could be formed if desired. It will thus be appreciated that the thermoformer 84 functions to form pairs of trays 16 and 18 into the sheet material 74 as it is advanced along the input path.

Following the thermoformer 84, another sheet of material 96 from a supply roll (not shown) is fed around rollers 98 and 100 and directed into engagement with the back or reverse side of the sheet material 74 for advancement therewith. The sheet material 96 defines the cover sheet 14 from which covers 22 and 24 and the connecting spine portion 26 are formed. Accordingly, the sheet material 96 can be formed of semi-rigid thermoplastic material, such as 20 gauge high-density polyethylene. If desired, a heater 102 can be provided over the input path beyond roller 100 for slightly heating and thus relaxing the sheet material 96 to remove any residual curvature after unrolling.

In accordance with the preferred embodiment, a reciprocating vacuum placer 104 is also provided along the feed path for automatically placing paper labels 106 or other inserts onto the cover sheet material 96. The placer 104 is of substantially conventional construction, characterized by cyclical vacuum operation to pick up multiple labels 106 simultaneously from supply stacks (not shown) and then place them onto the cover sheet material 96. For example, a reciprocating vacuum placer of the type available from Minnesota Automation, Inc. of Crosby, Minn., can be utilized. An electrostatic precipitator or static bar 108 can also be provided between the label placer 104 and roller 100 for imparting an electrostatic charge to the cover sheet material 96 so that the labels 106 will stay in proper position on the cover sheet over each corresponding pair of trays 16 and 18 in the underlying tray sheet material 74 after release by the placer 104. The precipitator 108 is of substantially conventional construction and is available from various commercial sources, including Amstat Industries of Glenville, Ill. Usage of the label placer 104 and electrostatic precipitator 108 is preferable, but optional.

After the tray sheet material 74 and cover sheet material 96 have been brought together for simultaneous advancement along the feed path, and any labels 106 have been positioned on the cover sheet material, a sheet of overlay material 110 can then be added. The sheet of overlay material 110 is fed from a similar supply roll (not shown) around rollers 112 and 114 and directed by edge guides 115 into position over the cover sheet material 96 for further advancement along the feed path. For example, an automatic optically based device of the type available from Converter Accessory Corp. of Succasunna, N.J., can be utilized. The overlay sheet of material 110 is also of thermoplastic material, such as six gauge low or medium density polyethylene. The width of material 110 can be selected so that the edges are inward of outside edges of each pair of albums 10, as shown, to form full open trap-ins, or so that the edges of the material 110 overlay the edges of materials 74 and 96 in order to form a fully sealed trap-in. After any sheet of overlay material 110 has been added, the sheets of tray material 74 and cover material 96 are then advanced through a sealing die or press 116 which forms the peripheral seals and spine rules 36 by means of a single die-hit without requiring any additional insulative material or manipulation thereof to prevent the sheet of overlay material 110 from being sealed on the spine portion 26 between covers 22 and 24 thereof. The heat sealing press 116 utilizes a unique die head, the features of which comprise an important part of the invention.

Figure 12:
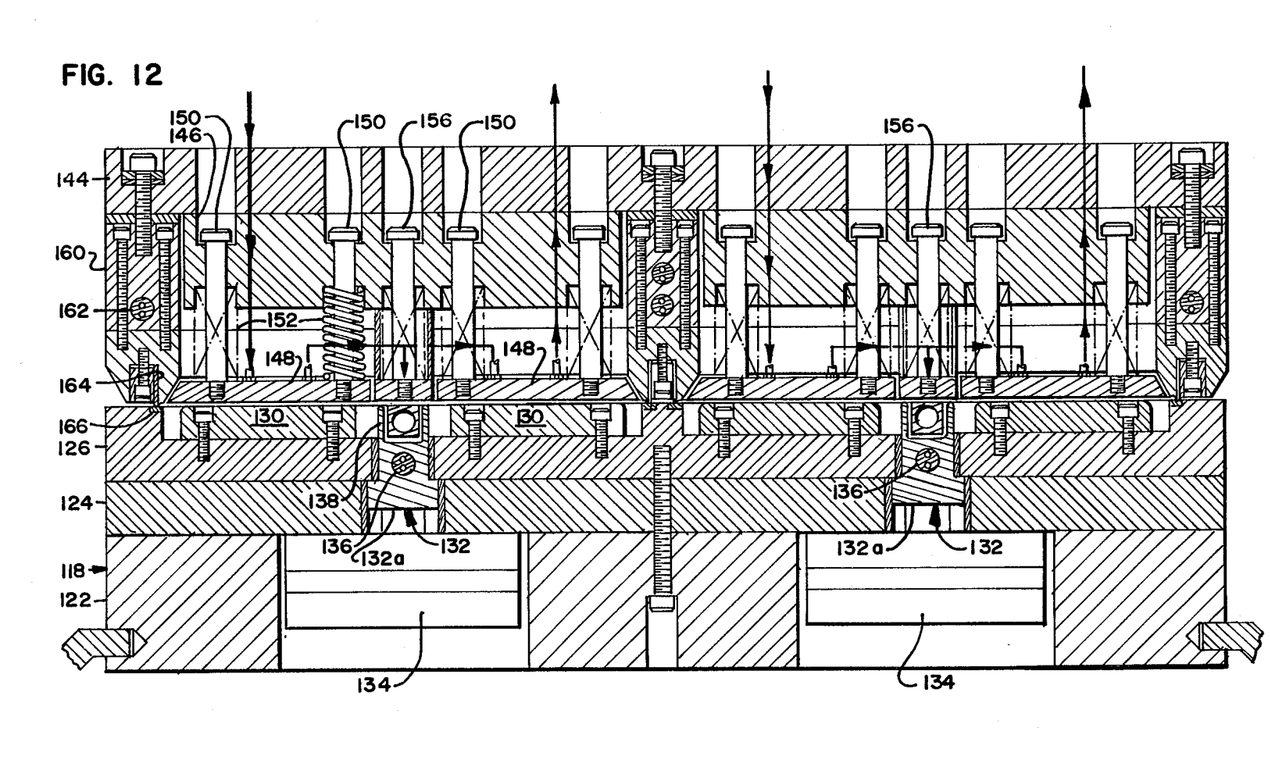
FIG. 12 is an enlarged cross-sectional view of the heat-sealing die taken generally along lines 12—12 of FIG. 11 in the direction of the arrows.
Figure 16:
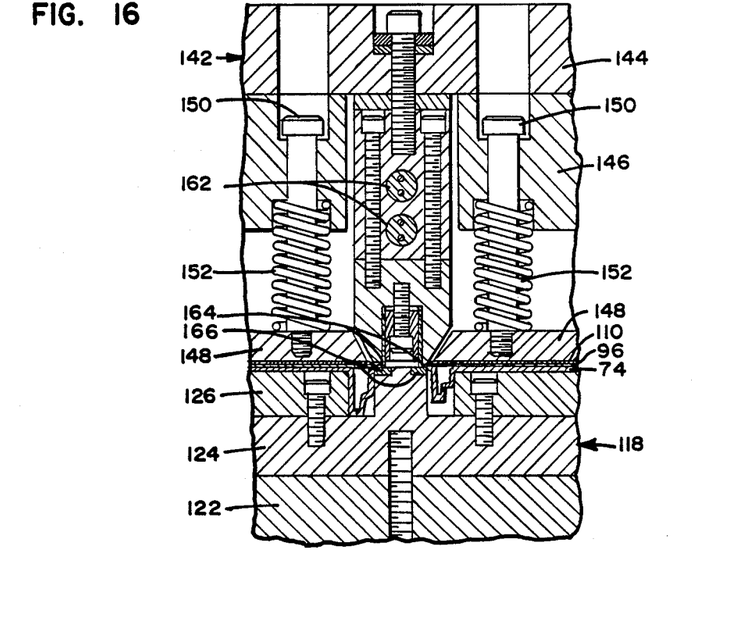

Referring now to FIGS. 12 and 16, the sealing press 116 includes a nesting fixture 118 which is mounted for reciprocal movement toward and away from the front side of the sheet of tray material 74 responsive to a double-acting cylinder 120. The nesting fixture 118 includes plates 122, 124 and 126 which are secured together by bolts 128. The uppermost plate 126 includes recesses with blocks 130 secured therein for receiving the pairs of trays 16 and 18 in the sheet of tray material 74.

As is best seen in FIGS. 12 and 16, the nesting fixture 118 also includes a movable head 132 mounted for movement between each corresponding pair of blocks 130 responsive to a double-acting pancake cylinder 134. FIG. 12 shows the fixture 118 in open position, without sheets 74, 96 and 110 therein. FIG. 16 shows the fixture 118 in closed position on the sheets. The movable head 132 includes a heated portion 132a which is movable relative to a stationary chilled portion 126a of plate 12b. Movable portion 132a and fixed portion 126a are adapted to engage different predetermined portions of the sheet of tray material 74 so as to control localized heating during formation of the spine rules 36, and thus preventing sealing of the sheet of overlay material 110 on the opposite side therefrom. In particular, the head 132 includes an electrical resistance heater element 136 extending inside the portion, the upper end of which defines a pair of laterally spaced-apart rules or bars 138 by which the spine rules 26 are formed. Bars 138 extend along opposite sides of the fixed portion 126a, which is cooled by circulation of refrigerant through an opening 140 therein. The ends of bars 138 can be sharp cornered to form groove 36 as shown in FIG. 5, or the corners can be broken to form a groove 36a as shown in FIG. 5a, either of which will result in an album 10 with a spine of less squarish appearance. If a more squarish spine is desired, the ends of the bars 138 can be sharpened in the form of 45° chisel point so as to define groove 36b in FIG. 5b. The front side of the sheet of tray material 74 is thus supported by blocks 130 inside trays 16 and 18 and by portion 126a, which both supports and cools the middle of the spine portion 20. The heated bars 138 of head 132 are selectively movable relative to blocks 130 and portion 126a to contact material 74 and thus form spine rules 36 as shown in FIG. 5, or the spine rules 36b as shown in FIG. 5a, depending upon the sharpness of the corners of the bars 138.

The sealing press 116 also includes a movable upper head or platen 142 mounted over the feed path for movement toward and away from the uppermost layer of sheet material 96 or 110, depending upon whether a trap-in is to be provided on the albums 10, resposive to a double-acting cylinder 143. The platen 142 includes plates 144 and 146 which are secured together by suitable connectors (not shown). Pairs of backup plates 148 are resiliently supported from plates 144 and 146 by means of bolts 150 and springs 152. One pair of backup plates 148 is provided for each corresponding pair of nesting blocks 130 in the underlying fixture 118. Similarly, a central backup plate 154 is supported opposite the underlying heated die head 132 by means of bolts 156 and springs 158. In addition, a stop 159 is provided about the compression springs 158 for limiting rebound of the central backup plate 154 upon extension of the heated head 132 by cylinder 134.

The platen 142 also includes heated peripheral bars 160 for cutting and heat sealing the peripheries of albums 10. In particular, each heated bar 160 includes an electrical resistance heater element 162 together with a cutting blade 164 which is positioned for engagement with a resilient insert 166 in the underlying plate 126 of the nesting fixture 118.

Figure 13:
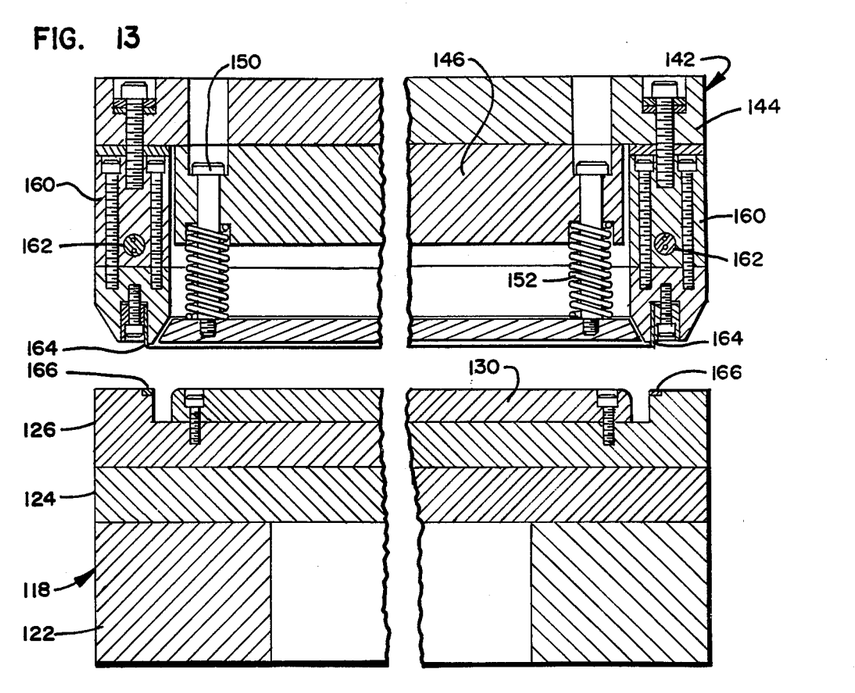
FIG. 13 is an enlarged cross-sectional view of the heat-sealing die taken along lines 13—13 of FIG. 11 in the direction of the arrows.
Figure 14:
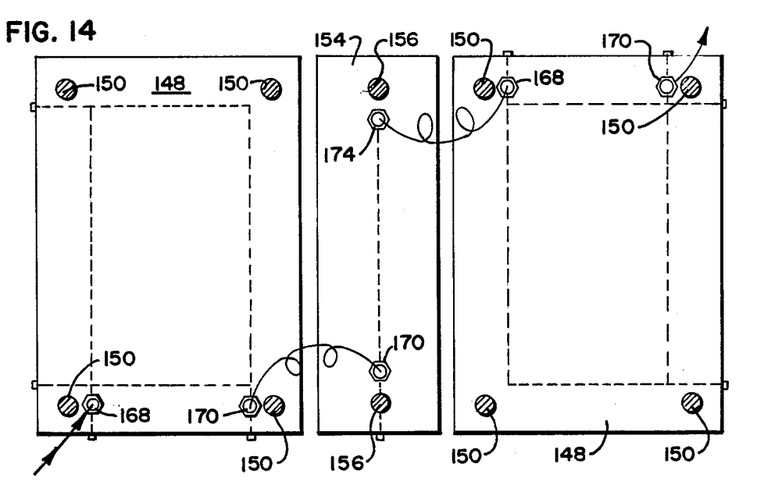
FIG. 14 is a illustration showing the arangement of cooling channels in the back-up plates of the sealing die.
Figure 15:
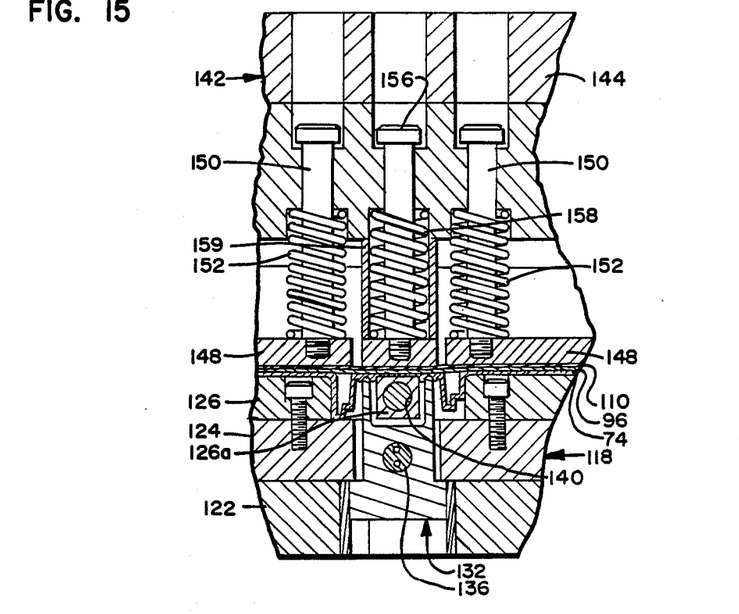
FIGS. 15 and 16 are enlarged partial cross-sectional views of the sealing die head.

The backup plates 148 and 154 are preferably cooled so as to control transmission of heat through the sheets of cover material 96 and overlay material 110, in order to form spine rules 26 and seal the spines of albums 10 without marring the smooth back surface of the cover sheet 14 or sealing the trap-in sheet 40. This comprises a significant feature of the present invention. As is best seen in FIGS. 12–14, backup plates 148 each include fittings 168 and 170 defining an inlet and an outlet for circulating coolant through channels, shown in phantom lines in FIG. 14, within the plates. Backup plate 154 similarly includes an inlet 172, outlet 174, and internal coolant channels.

Bars 126a and back-up plates 148 and 154 can be cooled by circulation of chilled water at about 45 to 44 degrees F.

After the layers of sheet material 74, 96 and 110 are advanced into the sealing die press, cylinders 120 and 143 are actuated to close the press. As the nesting fixture 118 moves upwardly, and the head 132 moves downwardly, the peripheral heater bars 160 cut and heat seal the corresponding edges of the sheets of material 74, 96 and 110 about each pair of trays 16 and 18 in the tray sheet. As the platen 142 and fixture 118 engage opposite sides of the stack of sheet materials, but before completion of peripheral cutting and sealing by the peripheral heated heads 160, the backup plates 148, and 154 yield so that any remaining air between the sheets is squeezed out to prevent any "pillow" effect. Simultaneously, cylinders 134 actuate the heated heads 132 upwardly against the front side of the spine portion 20, between the trays 16 and 18 in sheet material 74 to form the spine rules 36. The central backup plates 154 serve as anvils for the heads 132, but yield for ejection of the sealed connected albums from the press 116.

In accordance with the preferred construction, opposite ends of bars 138 of the heated portion 132a of head 132 are of slightly lesser depth so that the albums 10 are still attached to the layers of material by webs 176 of flashing at the opposite ends or corners of their spines, as seen in FIG. 11.

After formation of the albums 10, which are still connected by webs 176 between the sheets of material 74, 96 and 110, the sheets are advanced from the sealing press 116 for separation from the remaining lattice of sheets 74, 96 and 110, and then collection of the completed albums 10 for packaging and shipment.

From the foregoing, it will thus be apparent that the present invention comprises a two-ply cassette album having numerous advantages over the prior art. One advantage involves the fact that the album herein is of two-ply construction throughout and is of sufficient rigidity and structural integrity without utilizing any inserts between the tray and cover sheets. Another advantage involves the specialized spine rules formed in the front surface of the inner tray sheet to serve as living hinges that provide a smooth, less squarish and thus more pleasing appearance when the album is closed, without marring the outside cover sheet. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

WHAT IS CLAIMED IS:

1. Apparatus for automatically manufacturing video cassette albums, comprising:

means for feeding a first sheet of thermoplastic along a predetermined input path, said first sheet having front and back sides;

means positioned along the input path for thermoforming pairs of laterally spaced-apart trays into the front side of said first sheet;

means positioned along the input path beyond said thermoforming means for feeding a second sheet of thermoplastic along the input path adjacent to the back side of said first sheet; and means for substantially simultaneously forming laterally spaced-apart spine rules into the front side of said first sheet between each pair of trays while cutting said first and second sheets about each pair of trays and peripherally sealing adjacent edges of the cut sheets to form video cassette albums.

2. The apparatus of claim 1, wherein said means for forming spine rules and peripherally sealing said trays comprises:

a nesting fixture mounted for movement toward and away form the front side of said first sheet, said fixture including recessed and raised portions for receiving the pairs of trays formed in said first sheet;

a platen mounted across the input path opposite said nesting fixture;

a pair of cover backup plates mounted on said platen for movement toward and away from the raised portions of said nesting fixture;

means for normally biasing said cover backup plates toward said nesting fixture;

a heated head including two laterally spaced-apart bars mounted on said nesting fixture between the raised portions thereof for movement toward and away from said platen;

means for selectively actuating said heated head;

a spine backup plate mounted on said platen for movement toward and away from said nesting fixture; and means for normally biasing said spine backup plate toward said nesting fixture.

3. The apparatus according to claim 2, further including:

stop means for limiting movement of said spine backup plate away from said nesting fixture.

4. The apparatus according to claim 2, wherein said cover backup plates and said spine backup plates are cooled.

5. The apparatus according to claim 2, further including:

a cooled head mounted on said nesting fixture between the bars of said heater head for engaging the front side of said first sheet between the trays.

6. The apparatus of claim 1, further including:
means positioned along the input path beyond said second sheet feeding means for feeding a third sheet of thermoplastic along the input path over said second sheet; and
wherein said third sheet is cut and sealed to said second and third sheet about at least three edges thereof by said means for forming spine rules and peripherally sealing said trays to form a trap-in.

7. The apparatus according to claim 6, further including:
means positioned along the input path ahead of said third sheet feeding means for warming the second sheet to remove any residual curvature therefrom.

8. The apparatus according to claim 6, further including:
means positioned along the input path for placing labels on the second sheet ahead of said third sheet feeding means for sealing between the second and third sheets.

9. The apparatus according to claim 8, further including:
means associated with said label placing means for imparting an electrostatic charge to the second sheet to retain the labels in desired position thereon after placement.

10. A method for manufacturing video cassette albums, comprising the steps of:
(a) Feeding a first sheet of thermoplastic along a predetermined input path;
(b) Thermoforming pairs of laterally spaced-apart trays into the front side of said first sheet;
(c) Feeding a second sheet of thermoplastic along the input path adjacent to the back side of said first sheet;
(d) Contacting the second sheet with a thermally-cooled backup plate opposite at least the spine portion of said first sheet;
(e) Contacting the front side of the spine portion of said first sheet with thermally-heated rules to seal adjacent portions of said first and second sheets and define living hinges; and
(f) Forming spine rules into the obverse side of said first sheet between each pair of trays while substantially simultaneously thermally cutting and sealing the edges of said first and second sheets about each pair of trays to form two-ply video cassette albums.

11. The video cassette albums manufactured according to the method of claim 10.

12. The method of claim 10, wherein steps (e) and (f) are accomplished substantially simultaneously.

13. The method of claim 10, wherein said first and second sheets are comprised of polyethylene.

14. The method of claim 10, wherein the backup plate in step (d) is cooled by circulation of coolant therethrough.

15. The method of claim 10, further including, between steps (c) and (d), the step of:
feeding a third sheet of thermoplastic along the input path adjacent to said second sheet; and
wherein said third sheet is sealed about at least three edges thereof to said first and second sheets in step (f) to form a trap-in.

16. The method according to claim 15, wherein said third sheet is comprised of polyethylene.

17. The video cassette albums manufactured according to the method of claim 15.

* * * * *